United States Patent
Assaliyski

(10) Patent No.: US 11,597,314 B2
(45) Date of Patent: Mar. 7, 2023

(54) VEHICLE LAMP SYSTEM COMPRISING A COMPUTER ADJUSTING THE COLOR OR DIRECTION OF A LAMP BASED ON A ROAD USER'S GAZE DIRECTION

(71) Applicant: Ford Global Technologies, LLC, Dearborn, MI (US)

(72) Inventor: Marin Assaliyski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 17/169,595

(22) Filed: Feb. 8, 2021

(65) Prior Publication Data
US 2022/0250535 A1  Aug. 11, 2022

(51) Int. Cl.
*B60Q 1/08* (2006.01)
*B60Q 1/14* (2006.01)

(52) U.S. Cl.
CPC .......... *B60Q 1/085* (2013.01); *B60Q 1/1423* (2013.01); *B60Q 2300/40* (2013.01); *B60Q 2400/20* (2013.01)

(58) Field of Classification Search
CPC ........................ B60Q 2300/45; F21W 2103/60
See application file for complete search history.

(56) References Cited

U.S. PATENT DOCUMENTS

| | | | |
|---|---|---|---|
| 9,475,422 B2 | 10/2016 | Hulls et al. | |
| 9,855,890 B2* | 1/2018 | James | B60K 37/06 |
| 10,933,803 B2* | 3/2021 | Shih | B60Q 1/50 |
| 11,011,062 B2* | 5/2021 | Kitayama | G08G 1/166 |
| 2016/0167648 A1 | 6/2016 | James et al. | |
| 2017/0240098 A1 | 8/2017 | Sweeney et al. | |
| 2018/0276986 A1* | 9/2018 | Delp | B60K 35/00 |
| 2021/0046861 A1* | 2/2021 | Li | B60Q 1/143 |

FOREIGN PATENT DOCUMENTS

KR        20210000465 A   *  5/2021

OTHER PUBLICATIONS

Rouchitsas, A., et al., "External Human—Machine Interfaces for Autonomous Vehicle-to-Pedestrian Communication: A Review of Empirical Work," https://www.frontiersin.org/people/u/764218, Dec. 2, 2020, 19 pages.
Aouf, R.S., "Jaguar pedestrians Jaguar Land Rover's prototype driverless car makes eye contact with pedestrians," dezeen, Sep. 4, 2018, 13 pages.

* cited by examiner

*Primary Examiner* — Robert J May
(74) *Attorney, Agent, or Firm* — Frank A. MacKenzie; Bejin Bieneman PLC

(57) ABSTRACT

A computer includes a processor and a memory storing instructions executable by the processor to receive sensor data indicating a road user, determine a gaze direction of the road user based on the sensor data, and adjust at least one of a color or direction of a lamp of a vehicle based on the gaze direction.

19 Claims, 3 Drawing Sheets

VEHICLE LAMP SYSTEM COMPRISING A COMPUTER ADJUSTING THE COLOR OR DIRECTION OF A LAMP BASED ON A ROAD USER'S GAZE DIRECTION

BACKGROUND

Vehicles come equipped with headlamps. The headlamps are fixed relative to the vehicle and disposed at a front of the vehicle facing in a vehicle-forward direction. Types of lighting systems used for the headlamps include tungsten, halogen, high-intensity discharge (HID) such as xenon, light-emitting diode (LED), laser, etc.

DETAILED DESCRIPTION

Figure 1:
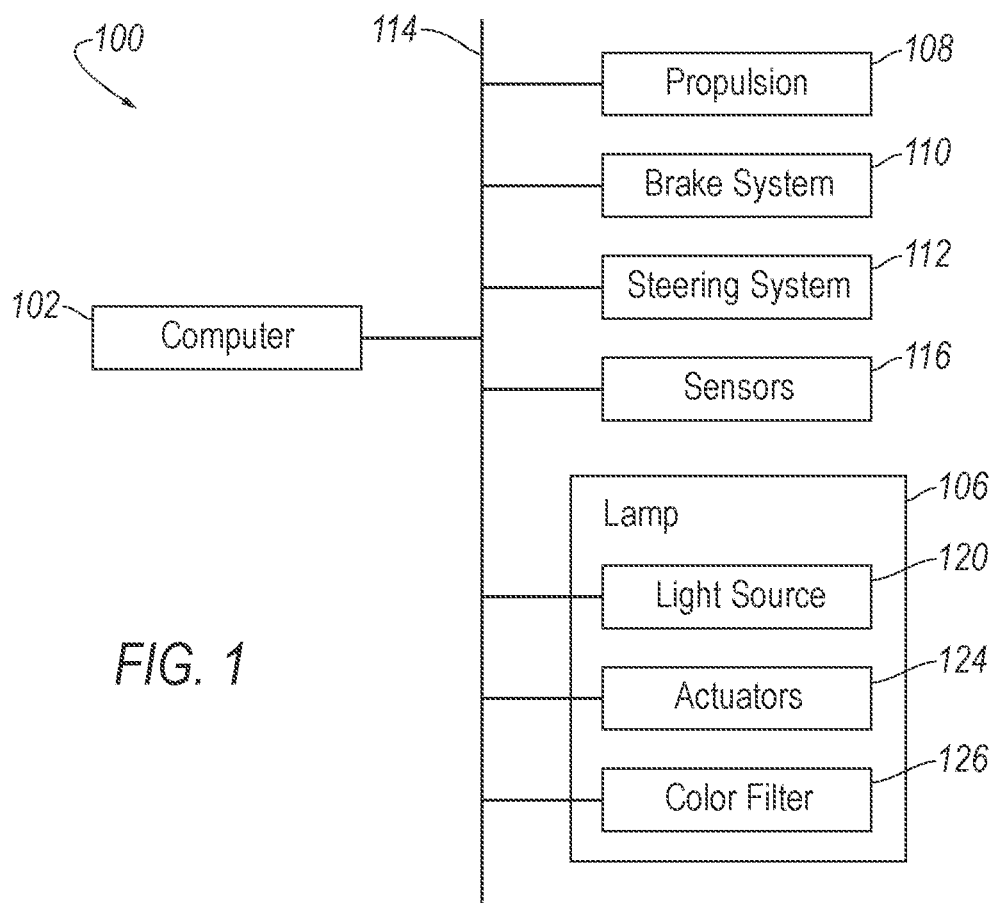
FIG. 1 is a block diagram of an example vehicle.

Autonomous vehicles can lack effective ways to communicate with other road users such as pedestrians. Subjects of communication can include intended actions of the vehicle, intended actions of the road user, and how to coordinate the actions. The system described herein provides a manner for performing these communications. First, the system determines a gaze direction and thereby a predicted action of the road user, e.g., the pedestrian is looking at the crosswalk and is likely to cross the crosswalk. Second, the system uses the gaze direction and predicted action to select a maneuver to perform, e.g., wait for the pedestrian to cross, and adjusts a color or direction of a lamp of the vehicle to communicate with the road user, e.g., turning the lamp green or sweeping a beam of the lamp along the crosswalk to indicate that the vehicle expects the pedestrian to cross first. The system thus provides an automated manner of communicating to road users in situations in which it would be impractical for a human operator to do so.

A computer includes a processor and a memory storing instructions executable by the processor to receive sensor data indicating a road user, determine a gaze direction of the road user based on the sensor data, and adjust at least one of a color or direction of a lamp of a vehicle based on the gaze direction.

The instructions may further include instructions to, before adjusting the color or direction of the lamp, aim the lamp at the road user. The instructions may further include instructions to, before aiming the lamp at the road user, lower a brightness of the lamp. The instructions may further include instructions to determine a distance to the road user, and lowering the brightness of the lamp may be based on the distance.

The instructions may further include instructions to determine a predicted action of the road user based on the gaze direction, and adjusting the color or direction of the lamp may be based on the predicted action. Determining the predicted action may include selecting the predicted action from a list, and the list includes crossing a crosswalk and not crossing the crosswalk.

The instructions may further include instructions to perform a maneuver of the vehicle based on the gaze direction. Performing the maneuver may occur after adjusting the color or direction of the lamp.

The road user may be a pedestrian, and performing the maneuver based on the gaze direction may include stopping until the pedestrian crosses a crosswalk based on the gaze direction being toward the crosswalk.

The instructions may further include instructions to adjust the color of the lamp based on the gaze direction.

The instructions may further include instructions to adjust the direction of the lamp based on the gaze direction.

The road user may be one of a pedestrian, a bicyclist, or a manned vehicle.

Adjusting the color or direction of the lamp based on the gaze direction may include adjusting the color of the lamp to green based on the gaze direction being toward a crosswalk.

Adjusting the color or direction of the lamp based on the gaze direction may include adjusting the color of the lamp to red based on the gaze direction being away from a crosswalk.

Adjusting the color or direction of the lamp based on the gaze direction may include adjusting the direction of the lamp to move a beam of the lamp along a crosswalk based on the gaze direction being toward the crosswalk.

A system includes a lamp and a computer communicatively coupled to the lamp. The computer is programmed to receive sensor data indicating a road user, determine a gaze direction of the road user based on the sensor data, and adjust at least one of a color or direction of the lamp based on the gaze direction.

The lamp may be a headlamp of a vehicle.

The system may further include a base, and the lamp may be mounted to the base and rotatable in two degrees of freedom relative to the base.

The color of the lamp may be adjustable to green, red, and untinted.

A method receiving sensor data indicating a road user, determining a gaze direction of the road user based on the sensor data, and adjusting at least one of a color or direction of a lamp of a vehicle based on the gaze direction.

With reference to the Figures, a computer 102 includes a processor and a memory storing instructions executable by the processor to receive sensor data indicating a road user 104, determine a gaze direction of the road user 104 based on the sensor data, and adjust at least one of a color or direction of a lamp 106 of a vehicle 100 based on the gaze direction.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 102 can be programmed to operate the vehicle 100 independently of the intervention of a human operator, completely or to a lesser degree. The computer 102 may be programmed to operate a propulsion 108, a brake system 110, a steering system 112, and/or other vehicle systems. For the purposes of this disclosure, autonomous operation means the computer 102 controls the propulsion 108, brake system 110, and steering system 112 without input from a human operator; semi-autonomous operation means the computer 102 controls one or two of the propulsion 108, brake system 110, and steering system 112 and a human operator controls the remainder; and nonautonomous operation means a human operator controls the propulsion 108, brake system 110, and steering system 112.

The computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 114 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the propulsion 108, the brake system 110, the steering system 112, sensors 116, the lamp 106, and other components via the communications network 114.

The propulsion 108 of the vehicle 100 generates energy and translates the energy into motion of the vehicle 100. The propulsion 108 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 108 can include an electronic control unit (ECU) or the like that is in communication with and receives input from the computer 102 and/or a human operator. The human operator may control the propulsion 108 via, e.g., an accelerator pedal and/or a gear-shift lever.

The brake system 110 is typically a conventional vehicle braking subsystem and resists the motion of the vehicle 100 to thereby slow and/or stop the vehicle 100. The brake system 110 may include friction brakes such as disc brakes, drum brakes, band brakes, etc.; regenerative brakes; any other suitable type of brakes; or a combination. The brake system 110 can include an electronic control unit (ECU) or the like that is in communication with and receives input from the computer 102 and/or a human operator. The human operator may control the brake system 110 via, e.g., a brake pedal.

The steering system 112 is typically a conventional vehicle steering subsystem and controls the turning of the wheels. The steering system 112 may be a rack-and-pinion system with electric power-assisted steering, a steer-by-wire system, as both are known, or any other suitable system. The steering system 112 can include an electronic control unit (ECU) or the like that is in communication with and receives input from the computer 102 and/or a human operator. The human operator may control the steering system 112 via, e.g., a steering wheel.

The sensors 116 may provide data about operation of the vehicle 100, for example, wheel speed, wheel orientation, and engine and transmission data (e.g., temperature, fuel consumption, etc.). The sensors 116 may detect the location and/or orientation of the vehicle 100. For example, the sensors 116 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 116 may detect the external world, e.g., objects and/or characteristics of surroundings of the vehicle 100, such as other vehicles, road lane markings, traffic lights and/or signs, pedestrians, etc. For example, the sensors 116 may include radar sensors, scanning laser range finders, light detection and ranging (LIDAR) devices, and image processing sensors such as cameras.

Figure 2:
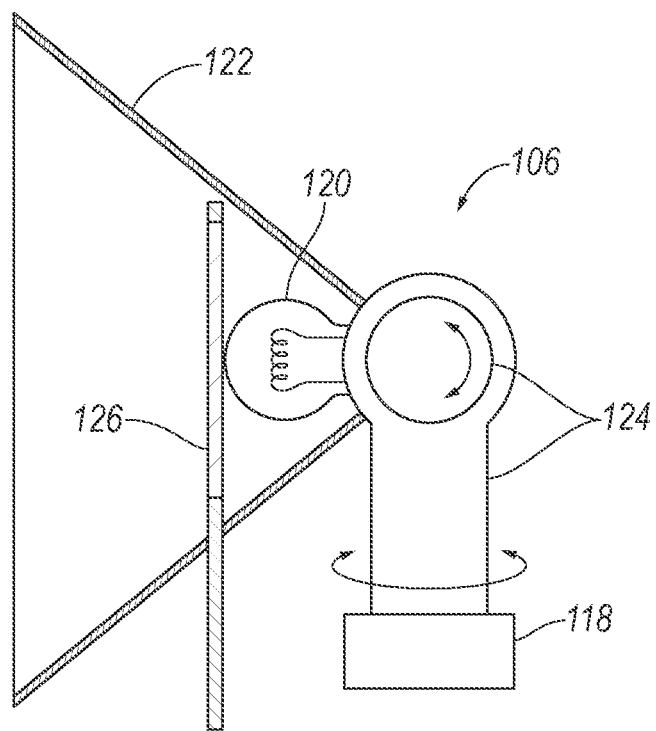
FIG. 2 is a side cross-sectional view of an example lamp of the vehicle.

With reference to FIG. 2, the vehicle 100 includes a base 118 for the lamp 106. The base 118 is fixed relative to a body of the vehicle 100. The base 118 is positioned at a front of the vehicle 100, e.g., at a grill of the vehicle 100.

The lamp 106 is mounted to the base 118. The lamp 106 can be, e.g., a headlamp of the vehicle 100. The lamp 106 can be used to illuminate a roadway in front of the vehicle 100 and/or make the vehicle 100 more easily visible to operators of other vehicles, in addition to the process described herein. Alternatively, the lamp 106 can be separate from the headlamps of the vehicle 100. The lamp 106 can include a light source 120, a reflector 122, one or more actuators 124, and a color filter 126.

The light source 120 can be any type suitable for illuminating a roadway in front of the vehicle 100, including tungsten, halogen, high-intensity discharge (HID) such as xenon, light-emitting diode (LED), laser, etc. The reflector 122 is positioned to reflect light emitted by the light source 120 in a vehicle-forward direction. For example, the reflector 122 can enclose the light source 120 except for the vehicle-forward direction. The reflector 122 can be fixed relative to the light source 120 or fixed relative to the base 118.

The lamp 106, specifically the light source 120, is rotatable relative to the base 118 by the actuators 124. For example, the light source 120 is rotatable in two degrees of freedom relative to the base 118, e.g., pitch and yaw. Pitch is rotation around an axis that extends laterally relative to the vehicle 100, i.e., tilting of the forward-facing light source 120 up and down. Yaw is rotation around an axis that extends vertically relative to the vehicle 100, i.e., turning of the forward-facing light source 120 left and right. The actuators 124 can be any suitable type for rotating the light source 120 in a controlled manner, e.g., an electromechanical actuator or stepper motor.

The color of the lamp 106, specifically of the light source 120, is adjustable by the color filter 126. For example, the color can be adjustable to green, red, or untinted, i.e., not filtered. The color filter 126 can actuate to place different filters in front of the light source 120, e.g., a green filter, a red filter, or no filter. Alternatively, the lamp 106 can include multiple light sources 120 of different colors, e.g., a green light source, a red light source, and an untinted light source, which can be selectively illuminated by the computer 102.

Figure 3:
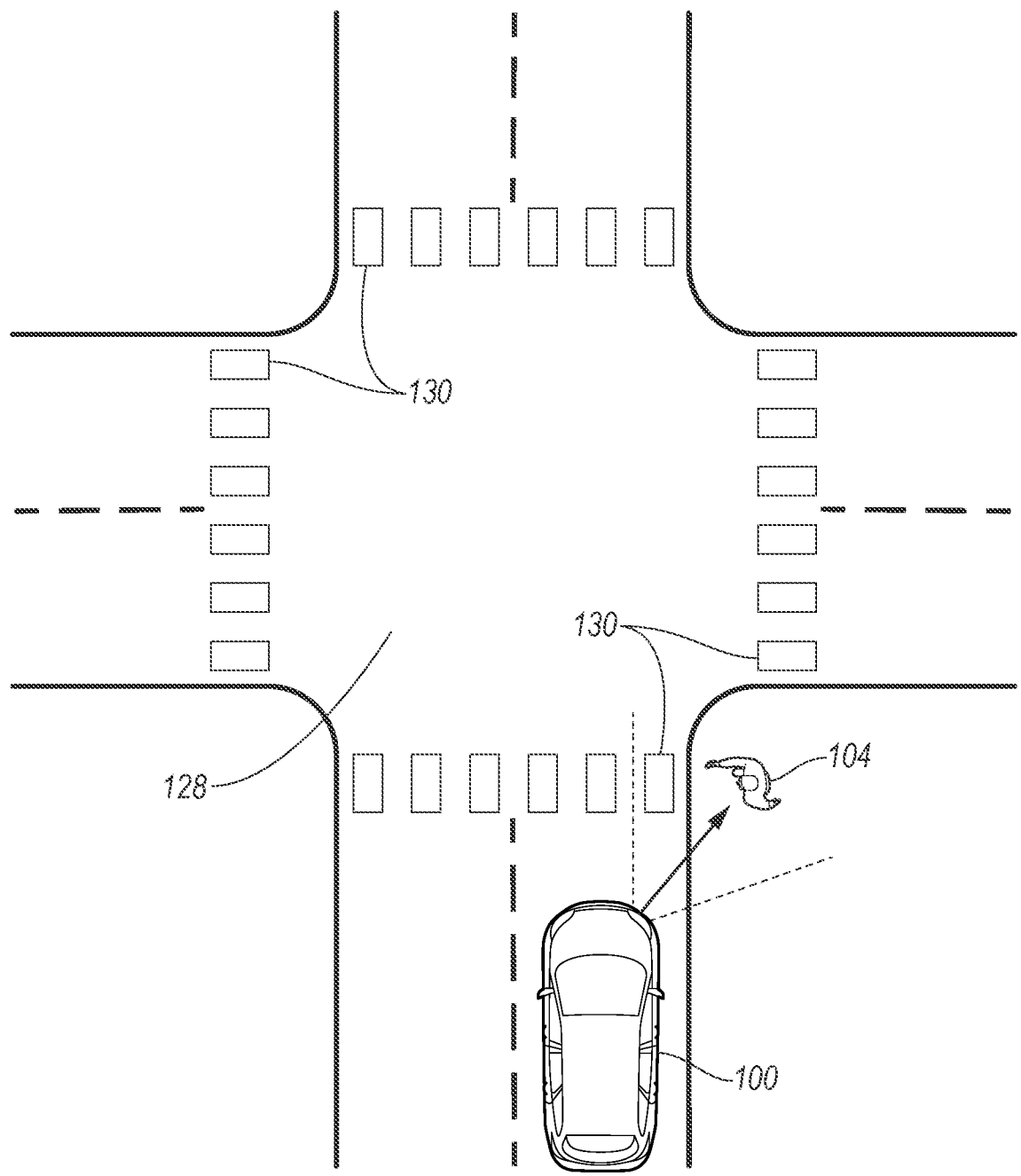
FIG. 3 is a diagram of the vehicle at an example intersection.

FIG. 3 illustrates an example scenario in which a process 400 for controlling the lamp 106 can be implemented, as described below. In the scenario, the vehicle 100 is approaching an intersection 128 having crosswalks 130. One or more road users 104 can also be near or in the intersection 128. For the purposes of this disclosure, a "road user" is a purposive entity that is using a roadway, e.g., a pedestrian, a bicyclist, another vehicle, etc. For example, FIG. 3 shows a pedestrian at a corner of the intersection 128. As described below with respect to the process 400, the computer 102 determines a gaze direction of the road user 104. For the purposes of this disclosure, a "gaze direction" is the direction in which a person's eyes are looking. Road users 104 that have a gaze direction include pedestrians, bicyclists, and manned vehicles, but not autonomous vehicles.

Figure 4:
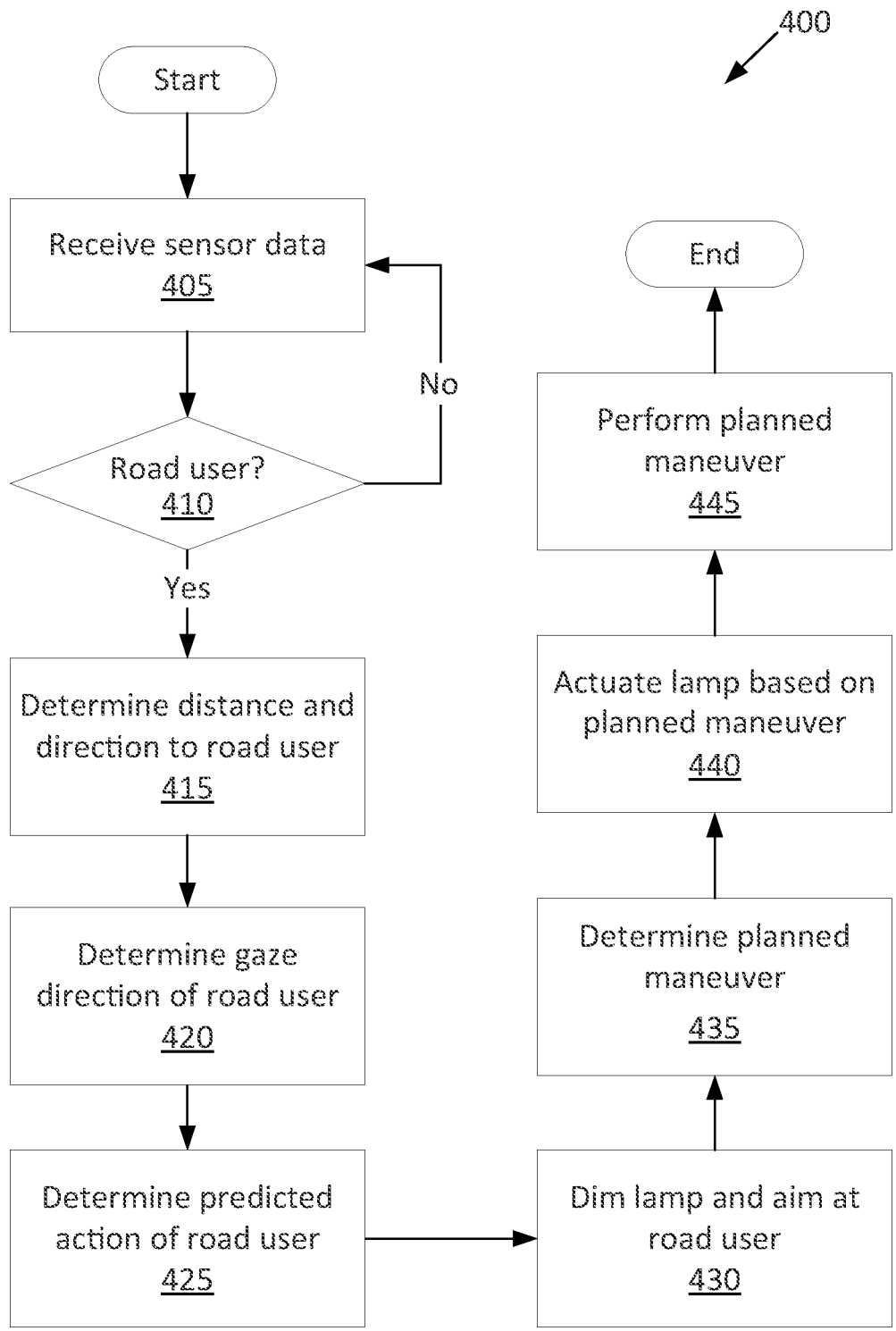
FIG. 4 is a process flow diagram of an example process for controlling the lamp.

FIG. 4 is a process flow diagram illustrating an exemplary process 400 for controlling the lamp 106. The memory of the computer 102 stores executable instructions for performing the steps of the process 400 and/or programming can be implemented in structures such as mentioned above. The process 400 can run when the vehicle 100 is in a fully autonomous mode. As a general overview of the process 400, once the computer 102 determines that a road user 104 is present based on sensor data from the sensors 116, the computer 102 determines a distance and direction from the vehicle 100 to the road user 104, determines the gaze direction of the road user 104, determines a predicted action of the road user 104, lowers a brightness of the lamp 106 and aims the lamp 106 at the road user 104, determines a planned maneuver based on the predicted action, then actuates the lamp 106 based on the planned maneuver, and then performs the planned maneuver.

The process 400 begins in a block 405, in which the computer 102 receives sensor data from the sensors 116. The sensor data includes image data and/or LIDAR data. The sensor data can be combined, e.g., according to known techniques, using sensor fusion to create a model of an environment surrounding the vehicle 100, including objects such as pedestrians, other vehicles, etc. Sensor fusion is combining data from disparate sources together so that the resulting data has less uncertainty than if the data from each source were used individually, e.g., in creating a unified model of the surrounding environment of the vehicle 100. The sensor fusion can be performed with one or more algorithms, e.g., Kalman filter, central limit theorem, Bayesian networks, Dempster-Shafer, convolutional neural networks, etc.

Next, in a decision block 410, the computer 102 determines whether the sensor data indicates a road user 104. The computer 102 can detect just one type of road user 104, e.g., pedestrians, or multiple types, e.g., pedestrians, bicyclists, and manned vehicles. The computer 102 can identify the road user 104 using conventional image-recognition techniques, e.g., a convolutional neural network programmed to accept images as input and output an identified object type. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential object type, and the final output is the object type with the highest score. If the object type with the highest score is, e.g., pedestrian, then a road user 104 is present. If the sensor data does not indicate any road users 104, the process 400 returns to the block 405 to continue scanning sensor data. If the sensor data indicates a road user 104, the process 400 proceeds to a block 415.

In the block 415, the computer 102 determines a distance and a direction to the road user 104 from the vehicle 100 using the sensor data. For example, the computer 102 can use a location of the object identified as the road user 104 in model created with the fused sensor data to calculate the distance and direction from the vehicle 100 to the road user 104. For another example, the computer 102 can use a pixel location of the object identified as the road user 104 in image data, which corresponds to a direction from the vehicle 100 to the road user 104, and the computer 102 can use a known approximate size of the road user 104 and a pixel height or width of the road user 104 in the image data to determine the distance from the vehicle 100 to the road user 104. The computer 102 can store known approximate sizes for different types of road users 104 in memory. The distance from the vehicle 100 to the road user 104 is the known approximate size for that type of road user 104 divided by the pixel size and multiplied by a known scaling value.

Next, in a block 420, the computer 102 determines the gaze direction of the road user 104 based on the sensor data. For example, the computer 102 can perform a facial-detection algorithm, the output of which characterizes a direction in which a detected face is looking. The computer 102 can use any suitable facial-detection technique, e.g., knowledge-based techniques such as a multiresolution rule-based method; feature-invariant techniques such as grouping of edges, space gray-level dependence matrix, or mixture of Gaussian; template-matching techniques such as shape template or active shape model; or appearance-based techniques such as eigenface decomposition and clustering, Gaussian distribution and multilayer perceptron, neural network, support vector machine with polynomial kernel, a naive Bayes classifier with joint statistics of local appearance and position, higher order statistics with hidden Markov model, or Kullback relative information.

Next, in a block 425, the computer 102 determines a predicted action of the road user 104 based on the gaze direction and on the surrounding environment. For the purposes of this disclosure, a "predicted action" is a movement on or use of the roadway that the computer 102 has determined that the road user 104 is likely to perform. The computer 102 can infer that the road user 104 will use a feature of the environment at which the gaze direction of the road user 104 is aimed. For example, the computer 102 can determine that the predicted action of the pedestrian with a gaze direction aimed at the crosswalk 130 is to cross the crosswalk 130, as shown in FIG. 3. For another example, the computer 102 can determine that the predicted action of the pedestrian with a gaze direction aimed downward (e.g., looking at a mobile device) is to remain stationary, i.e., not to cross the crosswalk 130. For another example, the computer 102 can determine that the predicted action of a road user 104 that is a manned vehicle with a gaze direction aimed leftward is to turn right because the road user 104 may be checking that the lane is clear. The memory of the computer 102 can store a list of predicted actions, and determining the predicted action can include selecting the predicted action from the list. The list can include crossing a crosswalk 130, not crossing a crosswalk 130, turning right, etc. Criteria for each predicted action on the list can be paired with the respective predicted action.

Next, in a block 430, the computer 102 lowers a brightness of the lamp 106 and then aims the lamp 106 at the road user 104. Aiming the lamp 106 at the road user 104 can attract the attention of the road user 104, making the subsequent adjustment of the color or direction of the lamp 106 below in a block 435 more likely to effectively communicate to the road user 104. The computer 102 can select a brightness of the lamp 106 based on the distance to the road user 104 determined in the block 415. The selected brightness is lower than a default brightness, i.e., the brightness is lowered, so that aiming the lamp 106 at the road user 104 does not interfere with the vision of the road user 104. The computer 102 instructs the light source 120 to lower to the selected brightness. The computer 102 instructs the actuators 124 to aim the lamp 106 at the road user 104. The computer 102 uses the direction to the road user 104 determined in the block 415 and aims the lamp 106 in the same direction with the actuators 124. The computer 102 can adjust the yaw of the lamp 106 to aim the lamp 106 in a horizontal direction toward the road user 104, and the computer 102 can adjust the pitch of the lamp 106 to aim the lamp 106 at a height of the detected face of the road user 104.

Next, in the block 435, the computer 102 determines a planned maneuver to be performed by the vehicle 100. The computer 102 determines the planned maneuver based on a predetermined route of the vehicle 100, the predicted action of the road user 104, and possibly right-of-way rules. The predetermined route of the vehicle 100 is known from the autonomous operation of the vehicle 100, is used to navigate the vehicle 100 to a final destination, and may be determined at a beginning of a current trip of the vehicle 100. In the absence of right-of-way rules or possibly overriding right-of-way rules, the computer 102 can determine the planned maneuver by deferring to the predicted action of the road user 104. For example, the route of the vehicle 100 is to travel straight through the intersection 128, and the predicted action of the pedestrian is to cross the crosswalk 130, from which the vehicle 100 determines the planned maneuver to be to wait for the pedestrian to cross before traveling across the intersection 128. For another example, the route of the vehicle 100 is to travel straight through the intersection 128, and the predicted action of the pedestrian is to not cross the crosswalk 130, from which the vehicle 100 determines the planned maneuver to be to travel across the intersection 128 without waiting for the pedestrian. For another example, the route of the vehicle 100 is to travel straight through the intersection 128, and the predicted action of the road user 104 that is a manned vehicle is to turn left across the path of the vehicle 100. The computer 102 can use the right-of-way rules to determine whether the planned maneuver is to travel across the intersection 128 or wait, e.g., waiting if the manned vehicle arrived first and the intersection 128 is a four-way stop.

Next, in the block 440, the computer 102 adjusts at least one of the color or direction of the lamp 106 based on the planned maneuver. If the planned maneuver is to wait for the road user 104, the computer 102 adjusts the color or direction of the lamp 106 to indicate that the road user 104 should proceed first, e.g., turning the color green and/or moving a beam of the lamp 106 along the crosswalk 130 for a pedestrian. If the planned maneuver is to proceed before the road user 104, the computer 102 adjusts the color or direction of the lamp 106 to indicate that the road user 104 should wait, e.g., turning the color red and/or aiming the beam at the ground directly in front of the road user 104. The computer 102 can adjust only the color, only the direction, or both, depending, e.g., on what adjustments the lamp 106 is capable of. The adjustment of the color or direction of the lamp 106 is based on the planned maneuver and is thereby based on the predicted action and the gaze direction of the road user 104, as described above. For example, the road user 104 is a pedestrian with a gaze direction toward the crosswalk 130, so the computer 102 determines that the predicted action is to cross the crosswalk 130, the planned maneuver is to stop until the pedestrian crosses the crosswalk 130, and the adjustment of the lamp 106 is turning green and/or moving the beam of the lamp 106 along the crosswalk 130. For another example, the road user 104 is a pedestrian with a gaze direction away from the crosswalk 130, so the computer 102 determines that the predicted action is to not cross the crosswalk 130, the planned maneuver is to travel across the intersection 128, and the adjustment of the lamp 106 is turning red and/or aiming the beam at the ground directly in front of the road user 104.

Next, in a block 445, the computer 102 actuates one or more vehicle components so that the vehicle 100 performs the planned maneuver, e.g., instructs the propulsion 108, the brake system 110, and the steering system 112 to perform the planned maneuver according to known techniques for autonomous operation. Performing the planned maneuver occurs after adjusting the color or direction of the lamp 106 so that the road user 104 has time to understand the meaning of the color or direction adjustment. After the block 445, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   receive sensor data indicating a road user;
   determine a gaze direction of the road user based on the sensor data;
   adjust a color of a lamp of a vehicle based on the gaze direction; and
   adjust a direction of the lamp based on the gaze direction.

2. The computer of claim 1, wherein the instructions further include instructions to, before adjusting the color of the lamp, aim the lamp at the road user.

3. The computer of claim 2, wherein the instructions further include instructions to, before aiming the lamp at the road user, lower a brightness of the lamp.

4. The computer of claim 3, wherein the instructions further include instructions to determine a distance to the road user, wherein lowering the brightness of the lamp is based on the distance.

5. The computer of claim 1, wherein the instructions further include instructions to determine a predicted action of the road user based on the gaze direction, wherein adjusting the color of the lamp is based on the predicted action.

6. The computer of claim 5, wherein determining the predicted action includes selecting the predicted action from a list, and the list includes crossing a crosswalk and not crossing the crosswalk.

7. The computer of claim 5, wherein determining the predicted action includes selecting the predicted action from a list of predicted actions stored in the memory.

8. The computer of claim 1, wherein the instructions further include instructions to perform a maneuver of the vehicle based on the gaze direction.

9. The computer of claim 8, wherein performing the maneuver occurs after adjusting the color of the lamp.

10. The computer of claim 8, wherein the road user is a pedestrian, and performing the maneuver based on the gaze direction includes stopping until the pedestrian crosses a crosswalk based on the gaze direction being toward the crosswalk.

11. The computer of claim 1, wherein the road user is one of a pedestrian, a bicyclist, or a manned vehicle.

12. The computer of claim 1, wherein adjusting the color of the lamp based on the gaze direction includes adjusting the color of the lamp to green based on the gaze direction being toward a crosswalk.

13. The computer of claim 1, wherein adjusting the color of the lamp based on the gaze direction includes adjusting the color of the lamp to red based on the gaze direction being away from a crosswalk.

14. The computer of claim 1, wherein the instructions further include instructions to move a beam of the lamp along a crosswalk based on the gaze direction being toward the crosswalk.

15. A system comprising:
    a lamp; and
    a computer communicatively coupled to the lamp;
    wherein the computer is programmed to:
        receive sensor data indicating a road user;
        determine a gaze direction of the road user based on the sensor data;
        adjust a color of the lamp based on the gaze direction; and
        adjust a direction of the lamp based on the gaze direction.

16. The system of claim 15, wherein the lamp is a headlamp of a vehicle.

17. The system of claim 15, further comprising a base, wherein the lamp is mounted to the base and rotatable in two degrees of freedom relative to the base.

18. The system of claim 15, wherein the color of the lamp is adjustable to green, red, and untinted.

19. A method comprising:
receiving sensor data indicating a road user;
determining a gaze direction of the road user based on the sensor data;
adjusting a color of a lamp of a vehicle based on the gaze direction; and
adjusting a direction of the lamp based on the gaze direction.

* * * * *